United States Patent [19]

Sugimoto et al.

[11] Patent Number: 5,788,742

[45] Date of Patent: Aug. 4, 1998

[54] METHOD AND APPARATUS FOR DEGASSING PROCESSING SOLUTION FOR SUBSTRATES

[75] Inventors: Hiroaki Sugimoto; Masaru Kitagawa, both of Kyoto, Japan

[73] Assignee: Dainippon Screen Mfg. Co., Ltd., Japan

[21] Appl. No.: 761,246

[22] Filed: Dec. 6, 1996

[30] Foreign Application Priority Data

Dec. 11, 1995 [JP] Japan .................................. 7-346459

[51] Int. Cl.⁶ .............................. B01D 19/00; B01D 61/00
[52] U.S. Cl. .......................... 95/46; 95/250; 96/6; 96/201
[58] Field of Search ............................ 95/46, 45, 249, 95/250; 96/6, 4, 218, 201

[56] References Cited

U.S. PATENT DOCUMENTS 5,053,060  10/1991  Kopf-Sill et al. ............................. 95/46
5,123,937  6/1992  Shibata et al. ............................... 95/46

FOREIGN PATENT DOCUMENTS 60-255120  12/1985  Japan ............................................. 96/6
4-4090      1/1992  Japan ............................................. 96/6
5-267149   10/1993  Japan .
6-121902    5/1994  Japan ........................................... 95/46
6-134446    5/1994  Japan ............................................. 96/6

*Primary Examiner*—Duane S. Smith
*Attorney, Agent, or Firm*—Ostrolenk, Faber, Gerb & Soffen, LLP

[57] ABSTRACT

The present invention provides a degassing apparatus having a temperature regulating function. The degassing apparatus includes a number of gas permeating tubes for enabling a processing solution to flow through one of the two flow paths partitioned by gas permeating membranes that allow permeation of a gas but prevent permeation of a liquid, while enabling warm water to flow through the other flow path. A temperature regulator regulates the temperature of the warm water fed to the gas permeating tubes, and a gas suction pump sucks the gas from the warm water.

9 Claims, 2 Drawing Sheets

METHOD AND APPARATUS FOR DEGASSING PROCESSING SOLUTION FOR SUBSTRATES

BACKGROUND OF THE INVENTION

1. Field of the Invention

The present invention relates to a method and an apparatus for degassing a processing solution (a chemical agent such as a developing agent or a resist solution), which is used for treating the surface of various substrates, such as semiconductor wafers and glass substrates for liquid-crystal display devices.

2. Description of the Related Art

When substrates are processed in a rotation-type substrate processing apparatus, or a spinner, a processing solution is sprayed from a spray nozzle onto each substrate that is rotated while being kept in a horizontal orientation. It is desirable to coat the substrate uniformly with the processing solution.

If a gas is mixed with or dissolved in the processing solution, however, bubbles may be formed on the substrate coated with the processing solution. These bubbles prevent uniform processing and cause an unevenness in the coating. This unevenness is especially detrimental in the developing process of substrates. In order to prevent such a problem, it is required to degass a processing solution before being fed to a rotation-type substrate processing apparatus.

In order to achieve appropriate processing with the processing solution, on the other hand, the regulation of the temperature of the processing solution is required. Namely the apparatus for feeding a processing solution is required to have the functions of degassing the processing solution and regulating the temperature of the processing solution.

FIG. 2 shows the structure of a prior art apparatus for feeding a processing solution. The processing solution-feeding apparatus includes a temperature regulating unit 10 for regulating the temperature of a processing solution with warm water and a degassing unit 20. Temperature regulating unit 10 and degassing unit 20 are connected to each other in series.

Since the prior art processing solution-feeding apparatus has the temperature regulating unit separate from the degassing unit, a long pipe line is required for the processing solution which occupies a large space in the apparatus, thereby making the whole apparatus undesirably bulky. The long piping for the processing solution leads to a high pressure for feeding the processing solution, thereby increasing the amount of the air dissolved in the processing solution.

SUMMARY OF THE INVENTION

Accordingly, an object of the present invention is to provide a degassing apparatus having a temperature regulating function.

The present invention is directed to an apparatus for degassing a processing solution for substrates. The apparatus comprises: a gas permeating tube having a gas permeating membrane and two flow paths partitioned by the gas permeating membrane, the gas permeating membrane allowing permeation of a gas but preventing permeation of a liquid, the gas permeating tube enabling a processing solution to flow through one of the two flow paths and enabling warm water to flow through the other of the two flow paths; temperature regulating means for regulating temperature of the warm water; gas suction means for suctioning out a gas from warm water; and warm water feeding means for feeding the warm water to the gas permeating tube.

While the temperature regulating means regulates the temperature of the warm water, the gas suction means degasses the warm water. Since the gas permeating tube has the gas permeating membrane that allows permeation of a gas but prevents permeation of a liquid, the temperature of the processing solution can be regulated to a fixed temperature while degassing the processing solution in the gas permeating tube.

In a preferred embodiment, the warm water feeding means comprises: a tank for storing the warm water, the tank having a nozzle connecting with a gas space formed above the surface of the warm water stored in the tank; and a circulation pump for circulating the warm water between the gas permeating tube and the tank; and wherein the gas suction means comprises a suction pump for suctioning a gas in the tank via the nozzle. This simple structure readily implements the degassing of the warm water.

The gas permeating tube comprises a plurality of hollow fiber membranes. The hollow fiber membranes are suitable as the gas permeating tube because they function as a gas permeating membrane that allows permeation of a gas while preventing permeation of a liquid, as well as functioning as a pipe line for heat exchange.

The present invention is also directed to a method of degassing a processing solution for substrates. The method comprises the steps of: providing a gas permeating tube having a gas permeating membrane and two flow paths partitioned by the gas permeating membrane, the gas permeating membrane allowing permeation of a gas but preventing permeation of a liquid, the gas permeating tube enabling a processing solution to flow through one of the two flow paths and enabling warm water to flow through the other of the two flow paths; regulating temperature of the warm water; suctioning a gas out of the warm water; and feeding the warm water to the gas permeating tube.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
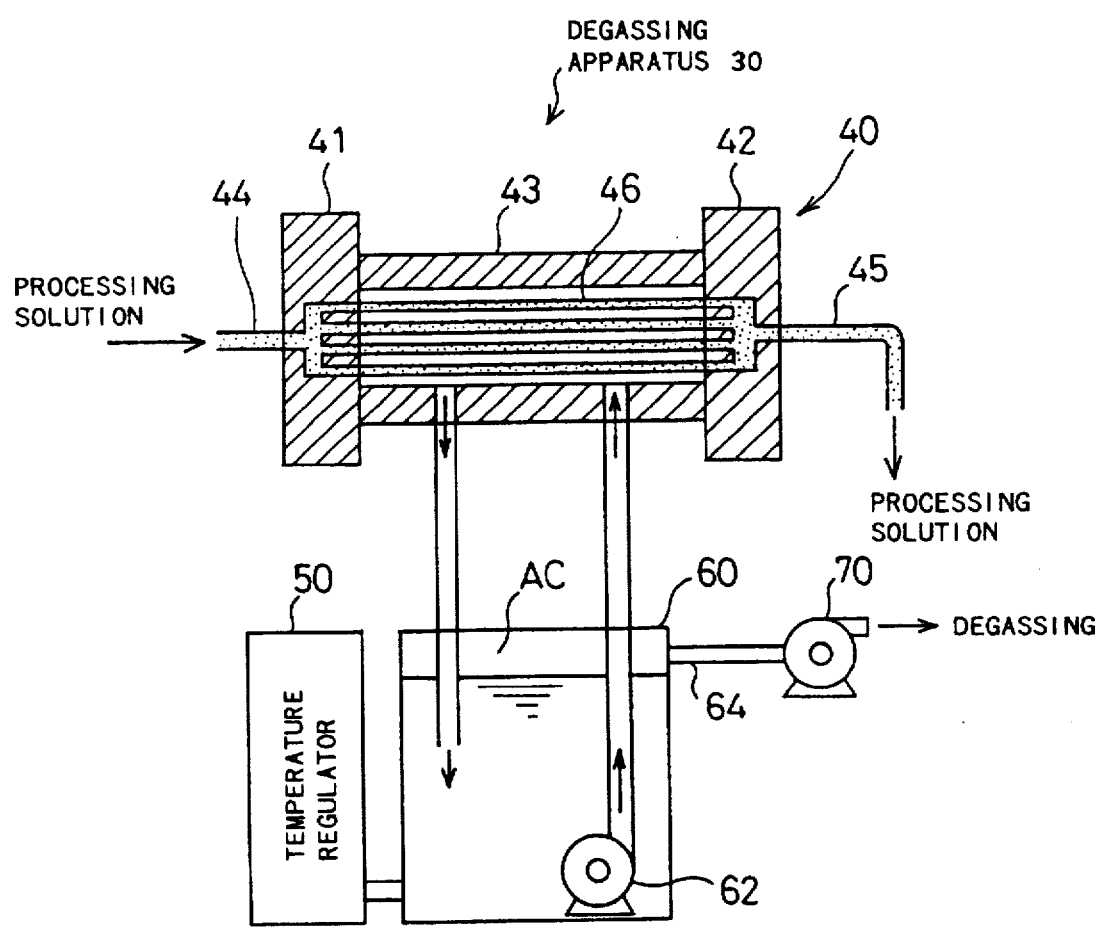
FIG. 1 shows the structure of a degassing apparatus embodying the present invention.
Figure 2:
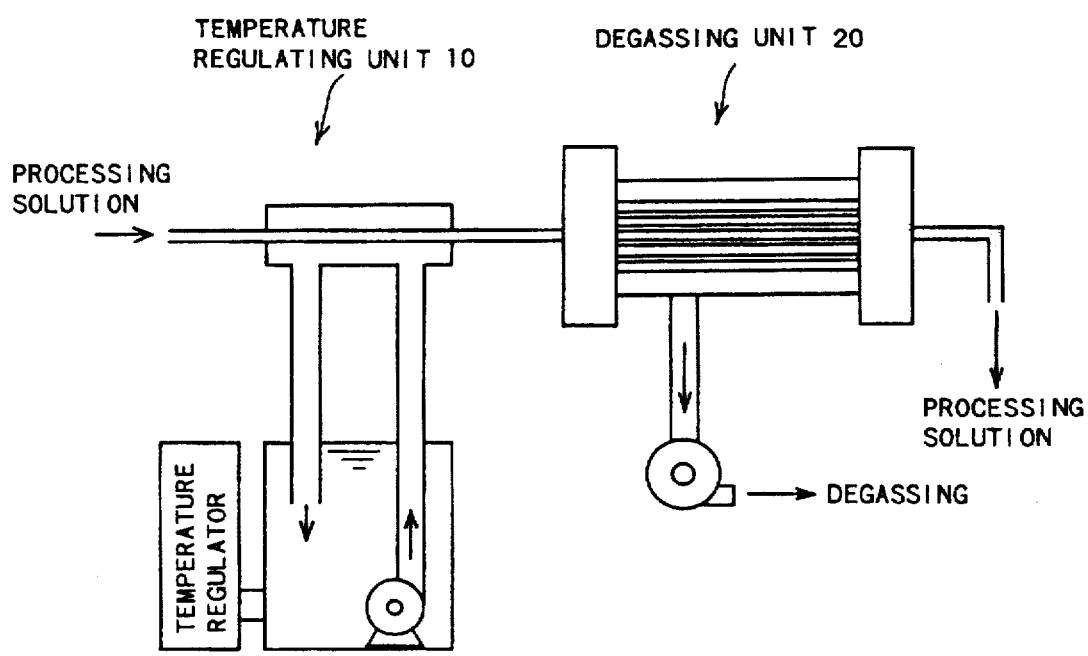
FIG. 2 shows the structure of a prior art apparatus for feeding a processing solution.

FIG. 1 shows the structure of a degassing apparatus 30 embodying the present invention. The degassing apparatus 30 includes a degassing module 40, a temperature regulator 50, a warm water tank 60, and a gas suction pump 70.

A circulation pump 62 for circulating warm water between the degassing module 40 and the warm water tank 60 is arranged inside the warm water tank 60. The temperature of the warm water in the warm water tank 60 is regulated to an appropriate level by means of the temperature regulator 50 having a temperature detector and a heater (not shown). The warm water is contained in the warm water tank 60 so that a gas space AC of not less than a predetermined size is formed above the surface of the water. A nozzle 64 is disposed at the position of the gas space AC and is connected to an intake vent of the gas suction pump 70.

The gas suction pump 70 operates to discharge the gas from the gas space AC of the warm water tank 60 so that the gas space AC has a reduced pressure. The gas mixed with or dissolved in the warm water in the tank 60 is accordingly expelled to the gas space AC. The preferable pressure in the gas space AC ranges from about 200 to 600 mmHg. In order to realize such a pressure range, an aspirator may be used as the gas suction pump 70. As clearly understood from this example, the gas suction pump in the present invention is not restricted to the means generally referred to as pumps but may be any means that can suction or draw off a gas.

The degassing module 40 further includes: a pair of flanges 41 and 42 arranged on either ends thereof; a cylindrical tube 43 arranged between the pair of flanges 41 and 42; and a number of gas permeating tubes 46 disposed in the cylindrical tube 43. Each gas permeating tube 46 is provided with a gas permeating membrane that allows permeation of a gas while blocking a liquid. The gas permeating tube 46 is, for example, a hollow fiber membrane made of a resin (for example, tetrafluoroethylene resin) having a resistance against the processing solution (i.e., chemical resistance). The hollow fiber membrane is suitable for the gas permeating tube 46 because it functions as a gas permeating membrane that allows permeation of a gas while preventing permeation of a liquid, as well as functioning as a pipe line for heat exchange.

A supply of processing solution fed via a pipe 44 to the first flange 41 passes through a number of gas permeating tubes 46 and flows out via the second flange 42 to another pipe 45. The processing solution flowing out to the pipe 45 is then supplied to a rotation-type substrate processing apparatus (or a spinner).

The space inside of the cylindrical tube 43 but outside of the gas permeating tubes 46 forms an outer flow path, through which flows warm water fed by the circulation pump 62. The temperature of the processing solution flowing through the inner flow path of the gas permeating tubes 46 is adequately regulated by means of the warm water flowing through the outer flow path. Since the warm water in the tank 60 has previously been degassed by the gas suction pump 70, the gas mixed with or dissolved in the processing solution is transferred to the flowing warm water through the gas permeating membranes of the gas permeating tubes 46.

As discussed above, in the structure of the embodiment, the processing solution flows through one of the two flow paths which are partitioned by the gas permeating tubes 46, while the degassed warm water flows through the other flow path. This structure achieves both the warming up of the processing solution and the expelling of the gas from the processing solution. In other words, this structure achieves both the temperature regulating function and the degassing function in one apparatus. This results in shortening the required length of piping for the processing solution and reducing the size of the whole apparatus for feeding a processing solution. The shorter length of piping lowers the required pressure for feeding the processing solution, thereby decreasing the amount of air dissolved in the processing solution and ensuring effective degassing. In the above embodiment, the gas space AC is formed in the upper portion of the warm water tank 60, and warm water is degassed by suctioning the gas in the warm water from the gas space AC by means of the gas suction pump 70. This simple structure effectively implements required degassing.

In the above embodiment, a number of gas permeating tubes 46 are arranged in the cylindrical tube 43. This structure increases the area of the processing solution in contact with the warm water via the gas permeating tubes 46, thereby attaining smooth heat exchange and shortening the time required for regulating the temperature of the processing solution.

In the above embodiment, the processing solution passes through the inner flow path of the gas permeating tubes 46, while warm water flows through the outer flow path. This structure may be inverted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for degassing a processing solution for substrates, said apparatus comprising:

a gas permeating tube having a gas permeating membrane and two flow paths partitioned by said gas permeating membrane, said gas permeating membrane allowing permeation of a gas but preventing permeation of a liquid, said gas permeating tube enabling a processing solution to flow through one of said two flow paths and enabling warm water to flow through the other of said two flow paths;

temperature regulating means for regulating temperature of said warm water;

gas suctioning means for suctioning a gas from said warm water; and warm water feeding means for feeding said warm water to said gas permeating tube.

2. An apparatus in accordance with claim 1, wherein said warm water feeding means comprises:

a tank for storing said warm water, said tank having a nozzle connecting with a gas space formed above the surface of the warm water stored in said tank; and a circulation pump for circulating the warm water between said gas permeating tube and said tank; and wherein said gas suction means comprises a suction pump for suctioning a gas in said tank via said nozzle.

3. An apparatus in accordance with claim 1, wherein said gas permeating tube comprises a plurality of hollow fiber membranes.

4. A method of degassing a processing solution for substrates, said method comprising the steps of:

providing a gas permeating tube having a gas permeating membrane and two flow paths partitioned by said gas permeating membrane, said gas permeating membrane allowing permeation of a gas but preventing permeation of a liquid, said gas permeating tube enabling a processing solution to flow through one of said two flow paths and enabling warm water to flow through the other of said two flow paths;

regulating temperature of said warm water;

suctioning a gas out of said warm water; and feeding said warm water to said gas permeating tube.

5. An apparatus for degassing a processing solution for substrates, said apparatus comprising:

a gas permeating tube having a gas permeating membrane and two flow paths partitioned by said gas permeating membrane, said gas permeating membrane allowing permeation of a gas but preventing permeation of a liquid, said gas permeating tube structured and arranged for the processing solution to flow through one of said two flow paths and for warm water to flow through the other of said two flow paths;

temperature regulator to regulate temperature of said warm water;

a gas suctioning device to draw off a gas from said warm water; and a warm water feeder to feed said warm water to said gas permeating tube.

6. An apparatus in accordance with claim 5, wherein said warm water feeder comprises:

a tank for storing said warm water, said tank having a nozzle connecting with a gas space formed above the surface of the warm water stored in said tank; and a circulation pump for circulating the warm water between said gas permeating tube and said tank; and wherein said gas suctioning device comprises a suction pump for suctioning a gas in said tank via said nozzle.

7. An apparatus for degassing a solution, said apparatus comprising:

a gas permeating tube partitioned into two flow paths by a gas permeating membrane, the gas permeating membrane provides for the passage of a gas therethrough but not a liquid, the gas permeating tube adapted for passage of a solution through one of the two flow paths and the passage of warm water through the other of the two flow paths, so that gas in the solution flowing through the one flow path passes through the gas permeating membrane and is carried off by the warm water flowing in the other flow path.

8. An apparatus in accordance with claim 7, further comprising a temperature regulator regulating temperature of the warm water.

9. An apparatus in accordance with claim 7, further comprising a gas suctioning device which draws away the gas carried off by the warm water.

* * * * *